C. M. BULLARD.
PURIFICATION OF SULPHUR DIOXIDE.
APPLICATION FILED DEC. 4, 1920. RENEWED FEB. 18, 1922.
1,410,535.
Patented Mar. 21, 1922.
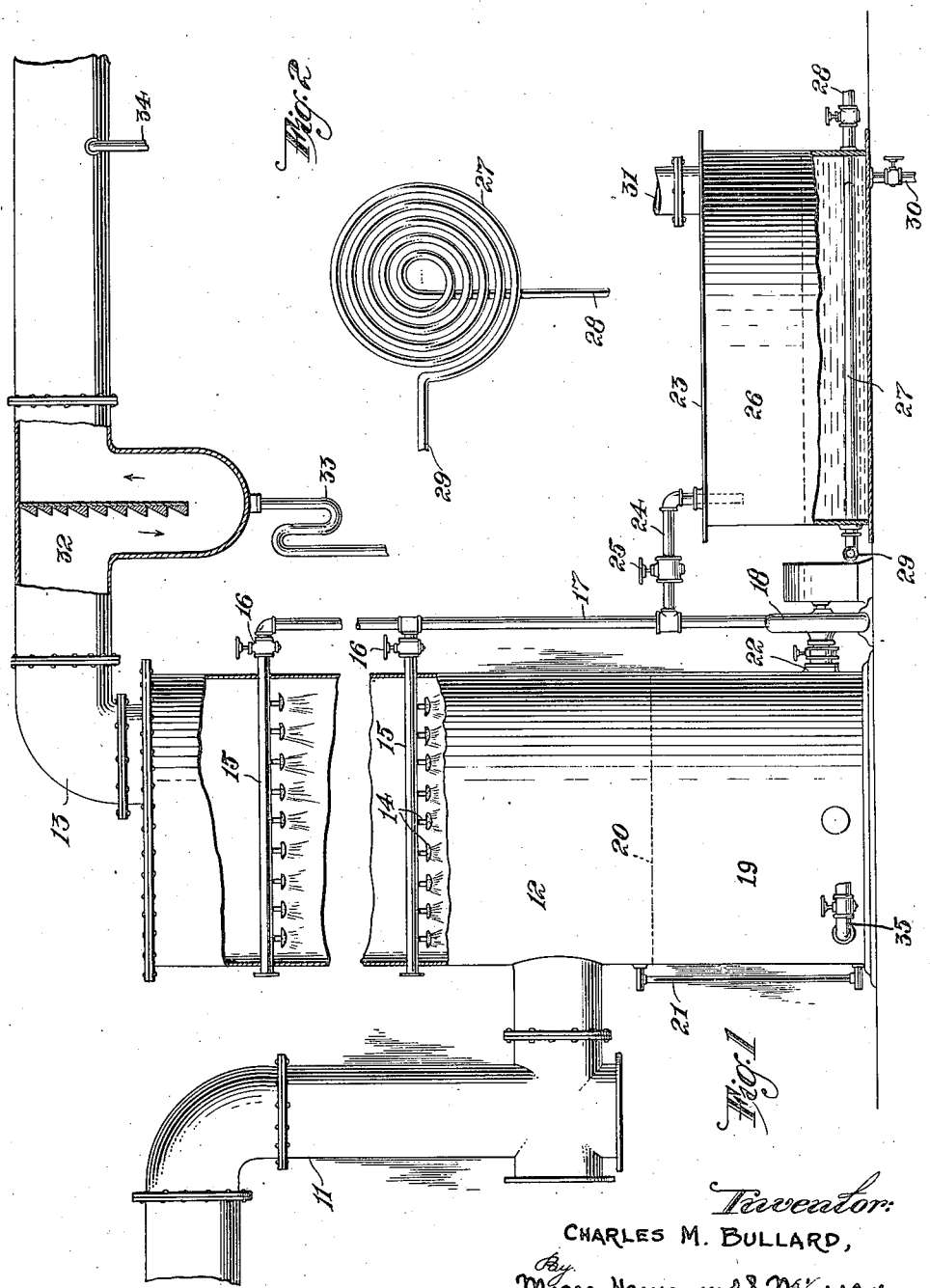
Inventor:
CHARLES M. BULLARD,
By Moses, Hammond & Middleton
Attorneys

UNITED STATES PATENT OFFICE.

CHARLES M. BULLARD, OF APPLETON, WISCONSIN.

PURIFICATION OF SULPHUR DIOXIDE.

1,410,535.  Specification of Letters Patent.  Patented Mar. 21, 1922.

Application filed December 4, 1920, Serial No. 428,411. Renewed February 18, 1922. Serial No. 537,662.

*To all whom it may concern:*

Be it known that I, CHARLES M. BULLARD, a citizen of the United States, residing in Appleton, county of Outagamie, and State of Wisconsin, have invented certain new and useful Improvements in the Purification of Sulphur Dioxide, of which the following is a specification.

In pulp making and in the production of $SO_2$ gas, it is well known that $SO_3$ is produced as an impurity in the $SO_2$ gas and it is highly desirable to remove this impurity before the $SO_2$ goes to the absorption system, so this invention relates to the purification of the $SO_2$ gas.

The invention consists essentially of passing the impure gas as it comes from the cooler or other source through a tower in which it encounters sprays of water, which sprays absorb the $SO_3$ but permit the purified $SO_2$ gas to pass through. The water, and $SO_3$ absorbed therein, are collected and heated to drive off any $SO_2$ gas which may have become absorbed, this $SO_2$ gas being led back to the cooler or elsewhere, and the weak liquid $SO_3$ (or $H_2SO_4$ that it then becomes) is discharged. This method can be adapted to have all these steps take place continuously if desired.

The invention has been illustrated by showing and describing one embodiment thereof, namely, the best of which I am at present informed, but it is to be understood that the invention is capable of many other embodiments and that the one shown is used in an illustrative and not a limiting sense.

In the drawings, Figure 1 shows a side elevation of my device and Figure 2 a detail.

In the drawings, the numeral 11 indicates a pipe which contains the gas from the cooler or other source. This gas is principally $SO_2$ but it has $SO_3$ in it as an impurity. The gas goes to a tower 12 where it passes upwardly therethrough and in which it is purified of its $SO_3$ and exits through outlet 13. In the upper part of the tower 12, I provide a plurality of spray nozzles 14 which depend from pipes 15 extending across the tower, which pipes are controlled by a valve 16 and which pipes have water fed to them from a conduit 17 in circuit with which is a pump 18. In the bottom of the tower is a liquid reservoir 19, the normal liquid level of which is indicated by a dotted line 20. 21 indicates a gauge glass to show the liquid level. The pump 18 is adapted to take liquid from the reservoir 19 by means of outlet 22 and elevate it to the sprays 14. The pump 18 may also supply a small stream of the liquid in reservoir 19 to a distilling apparatus 23 through the medium of a pipe 24 which is controlled by valve 25.

The distilling apparatus 23 preferably consists of a fairly shallow tank 26 having in the bottom thereof a steam coil 27, the steam coil having an inlet 28 and an outlet 29. The liquid in the tank can be removed by valved outlet 30 and the gasified $SO_2$ leaves the distilling apparatus through conduit 31 which carries it back to the cooler or elsewhere.

32 indicates a moisture separator in the gas outlet 13 and 33 represents the moisture drip. 34 is a duct leading to an $SO_3$ detector. 35 represents a fresh water inlet to the liquid reservoir. In operation the gas with its impurity comes from the cooler or other source through the inlet pipe 11 and passes upwardly through the tower 12 where it meets the water in spray form passing downwardly or in a direction opposite to the flow of the gas. This water in spray form completely fills the tower so that it is impossible or next to impossible for the gas to get through the tower without coming in contact with some particles of water and these particles of water are depended upon to absorb the impurity in the gas, namely $SO_3$, so that the gas which passes through the outlet 13 is practically pure $SO_2$ and any moisture remaining in the purified gas is removed therefrom by the moisture separator 32, so that the $SO_2$ gas, purified and dried, passes to the absorption system. The falling liquid collected in the reservoir 19 gradually becomes saturated with the $SO_3$ so it becomes necessary to remove the saturated liquid to the distilling apparatus 23 where, by means of heat supplied by coil 27, any remaining $SO_2$ is gasified and driven off through exit 31 back to the cooler or elsewhere and the remaining liquid discharge saturated with $SO_3$ is driven off through outlet 30.

Until the liquid in the reservoir 19 becomes saturated, pump 18 draws it out of the reservoir and forces it up through the sprays. The adding of fresh water and the purification of the saturated water in the reservoir can take place intermittently, or the valve 25, the valve in the fresh water inlet 35, and the valve 30 may be "cracked" so that the water in the reservoir is being constantly freshened and constantly fed to the distilling apparatus.

It will thus be seen that I have devised a very simple apparatus for removing the impurity from $SO_2$ gas, one that is cheap to build and yet very efficient in operation.

What I claim is:

A method of purifying gaseous $SO_2$ having gaseous $SO_3$ as an impurity, consisting in passing the gas upwardly through a falling absorbing medium, whereby the medium absorbs the impurity and a portion of the $SO_2$, collecting the absorbing medium and removing from it any of the $SO_2$ it may have absorbed.

In testimony whereof I have affixed my signature to this specification.

CHAS. M. BULLARD.